Aug. 14, 1962 L. J. BISHOP 3,049,246
SORTING SYSTEM FOR POST OFFICES AND THE LIKE
Filed Feb. 4, 1957 6 Sheets-Sheet 2
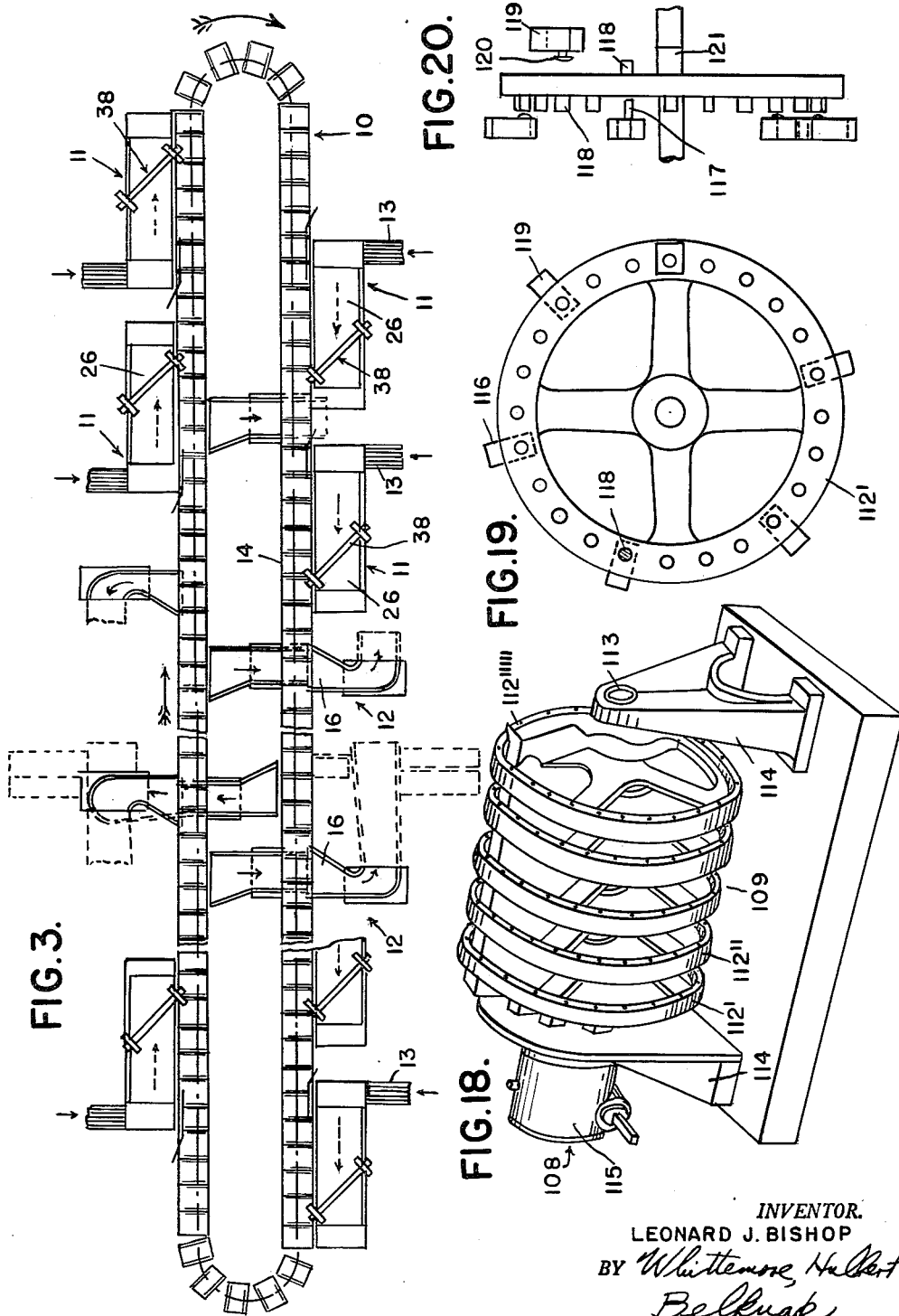
INVENTOR.
LEONARD J. BISHOP
BY Whittemore, Hulbert &
Belknap
ATTORNEYS Aug. 14, 1962     L. J. BISHOP     3,049,246
SORTING SYSTEM FOR POST OFFICES AND THE LIKE
Filed Feb. 4, 1957     6 Sheets-Sheet 3

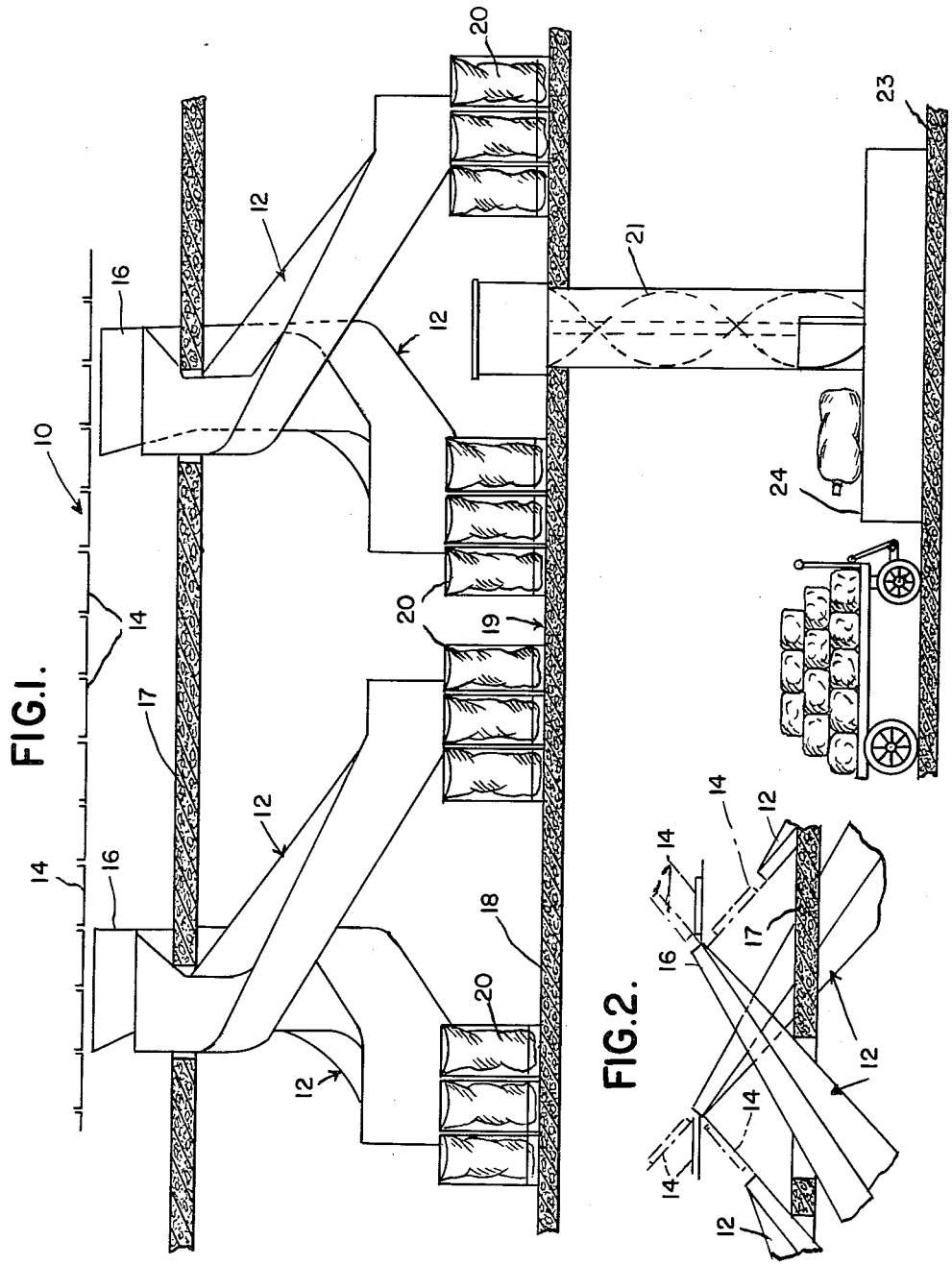

INVENTOR.
LEONARD J. BISHOP
BY Whittemore, Hulbert
Belknap
ATTORNEYS

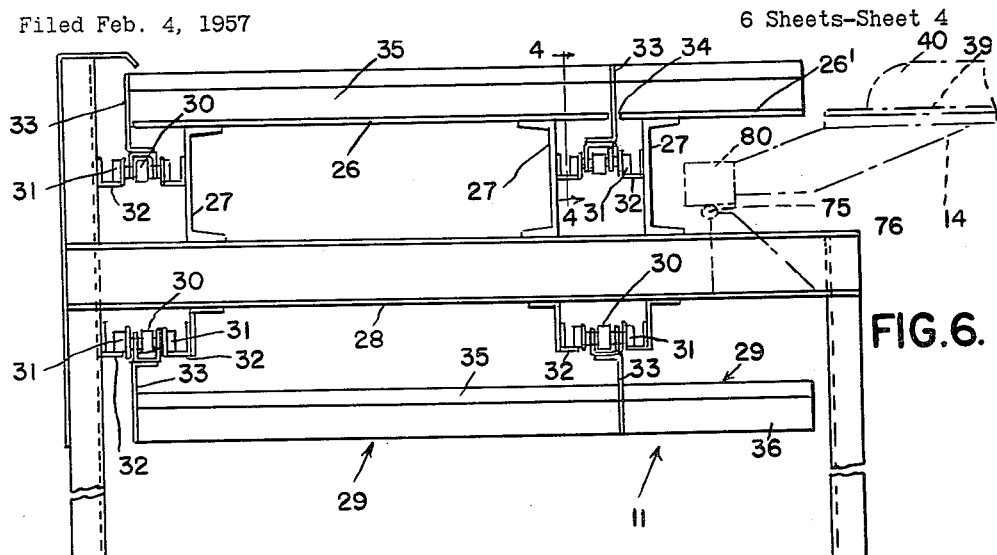
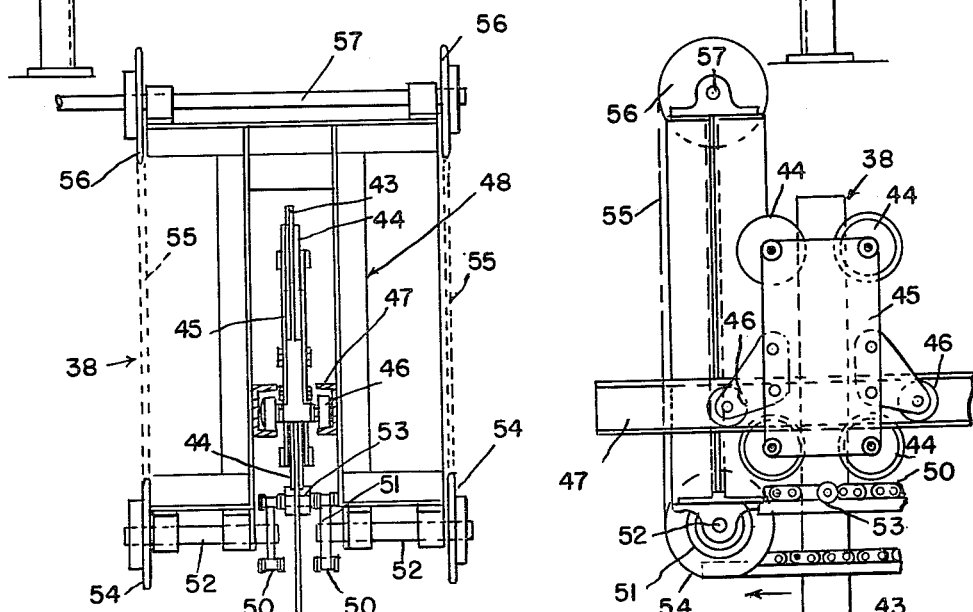
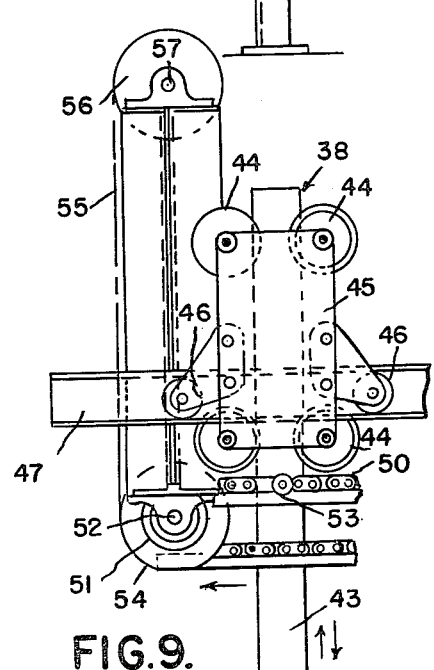
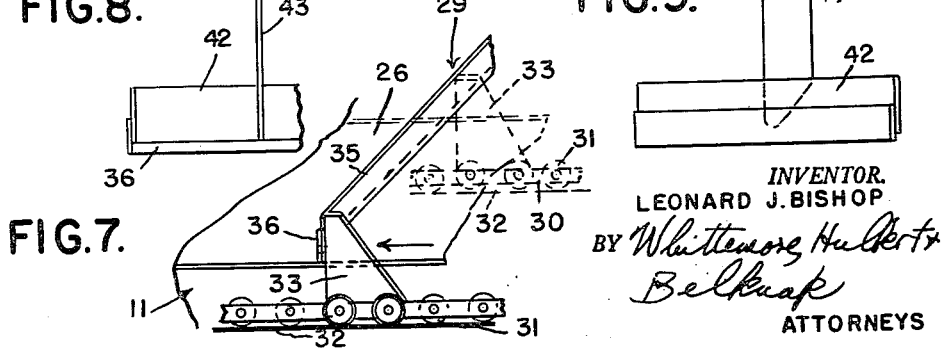

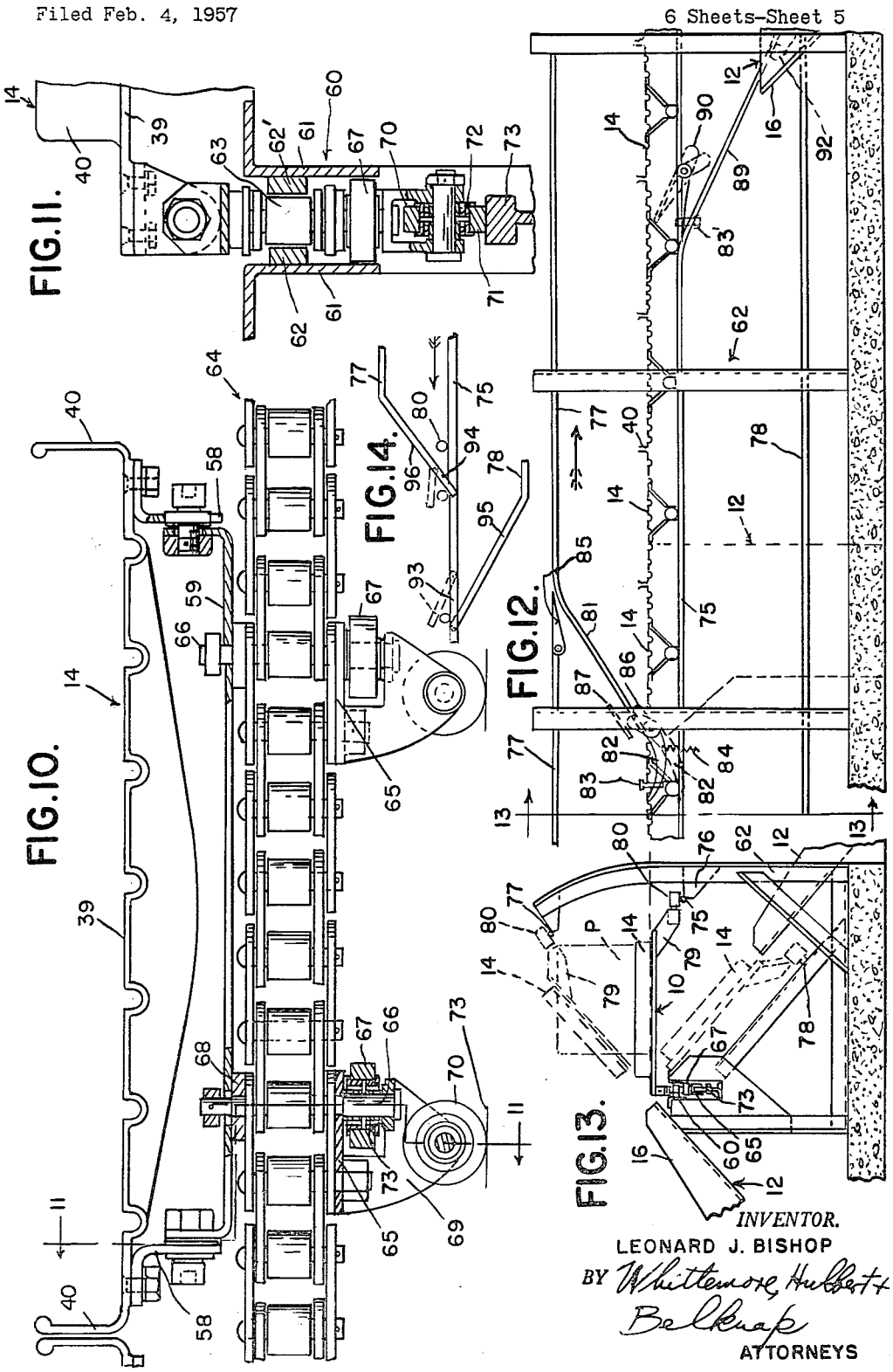

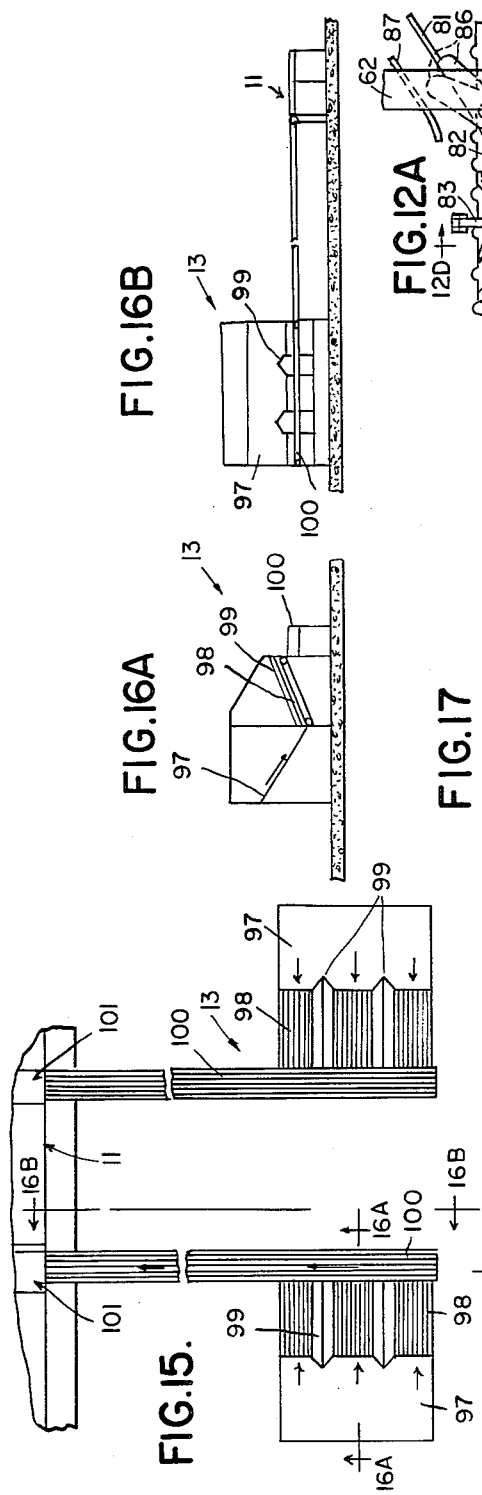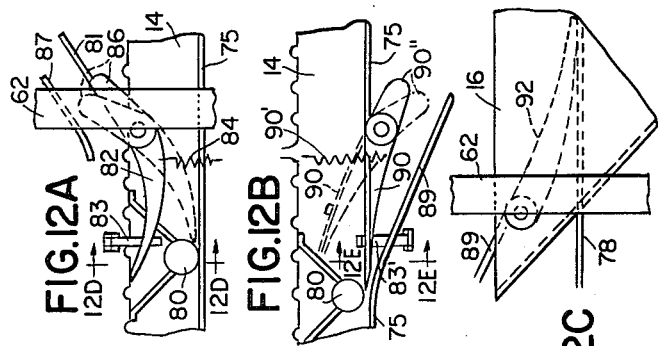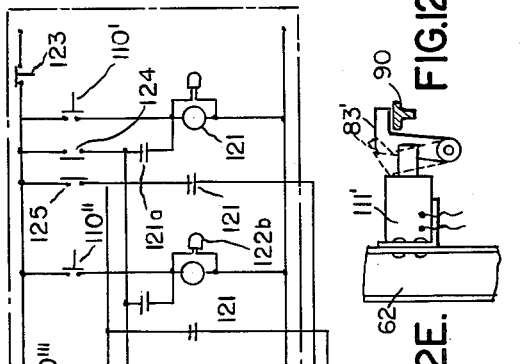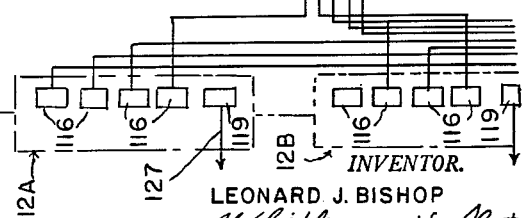

United States Patent Office 3,049,246
Patented Aug. 14, 1962

3,049,246
SORTING SYSTEM FOR POST OFFICES
AND THE LIKE
Leonard J. Bishop, Birmingham, Mich., assignor to Mechanical Handling Systems, Inc., Detroit, Mich., a corporation of Michigan
Filed Feb. 4, 1957, Ser. No. 637,999
11 Claims. (Cl. 214—11)

The present invention relates to an improved article sorting method and system for post offices and generally related installations. More particularly, the invention as disclosed deals with the primary parcel sorting phase of a postal operation in which parcels and the like are roughly or relatively generally classified as to their destination, i.e., state, city, district, borough or like subdivision, depending on the particular installation, and are forwarded to appropriate disposal chutes or stations identified with the respective sub-divisions, prior to further generally manual sorting as regards yet smaller subdivisional areas. Although specially to expedite post office sorting it will become evident as the description proceeds that the system and its component units also lend themselves to other settings.

It is an object of the invention to provide improved equipment of the foregoing nature which is compact yet of large capacity and speed in operation as required, for example, for use in a central post office or large substation serving a metropolitan center, and accommodating the manual feeding and visual sorting operations of a considerable personnel.

Another object is to provide apparatus of the sort described which is inexpensive in regard to its component parts of equipment, being rugged in nature to withstand inevitable rough treatment without likelihood of breakdown time loss.

A still further object is to provide a sorting system as described which includes a continuously traveling horizontal conveyor composed of parcel transporting receptacles articulated end to end to one another, a set of primary sorting and loading stations associated with this conveyor on either side thereof, which stations are located in advance of a series of destination chute stations, also disposed on either side of the conveyor. Discharge of parcels to selected destination chutes is effected automatically by shifting the conveyor members or receptacles from their normal horizontal traveling position to variably tilted positions, in which parcels are gravitationally discharged to chutes at one side of the conveyor or other. The selection in this regard is under the control of an operator at each of the several primary sorting and loading stations, who manipulates a set of push buttons of a conventional memory device. This device is operatively connected to means guiding the moving conveyor receptacle at the several chute stations, in such manner that a receptacle selected as to destination by an attendant at the primary sorting station is unfailingly tilted upon arrival at the appropriate chute station to discharge its parcel, following which further sorting and/or loading may be performed by other personnel.

More specifically, it is an object to provide equipment of the foregoing character, in which the traveling conveyor receptacles are individually pivoted on a guiding and advancing chain disposed at one side thereof, and in which these receptacles are controlled at their other side by an elongated cam rod or track. The rod in question has lowered valley portions at chute stations along one side of the conveyor, and has rise portions at the respective chute stations along the same side, whereby a conveyor receptacle guided horizontally on an intermediate track rod portion is cammed upwardly or downwardly from normal horizontal position to either of two discharge positions. Latched switch track elements are located at the points of merger of this intermediate guide rod portion with the valleys and risers to control the advancing receptacle as to whether it tilts or continues uninterruptedly in a horizontal position along the intermediate track. The operation of the switch tracks is in delayed response to operator manipulation of the memory device at the primary sorting station.

In accordance with another specific object, means are provided whereby all tilted receptacles are restored to horizontal position on the main or intermediate rod or track portion following their travel past the destination chute stations.

It is another object of the invention to provide an improved primary sorting and/or loading station unit, per se, to be controlled by an attendant in the manner set forth above. This component of the equipment includes a flighted push bar type conveyor operating to forward parcels placed thereon in a direction paralleling the main conveyor path, and in timed relation to its advance of parcel receptacles, to an improved, diagonally acting transfer member mechanism, also synchronized accurately with the main conveyor. This mechanism includes an elongated blade disposed parallel to and at one side of the path of movement of the flight conveyor, but transported diagonally at such an angle relative to the latter, and at the same speed as to its longitudinal, parallel component, so as to maintain a parcel pushed by a conveyor flight under the positive control of that flight and the transfer blade at all times. Hence a parcel is unfailingly delivered accurately onto a selected conveyor pan or receptacle.

A still further object is to provide primary sorting or loading equipment as described in the preceding paragraph, in which novel provision is made to clear the transfer blade above the push bar of the flight conveyor upon a return stroke of the transfer blade away from the main conveyor. This is accomplished by employing a horizontal, angularly disposed chain trained about transversely spaced sprockets arranged at an angle to the main conveyor. The transfer blade is carried by this chain, being appropriately guided for horizontal rectilinear movement. The blade is also appropriately guided for vertical movement as its chain rounds the sprocket adjacent the main conveyor, so as to be elevated above the push bar of the primary sorter unit upon its return stroke.

In general, the invention has for its object the provision of an improved method for the primary, rough or bulk sorting or classification of articles such as parcels and the like (it being understood that the term "parcels" is to be construed broadly in the specification and claims to follow, so as to embrace other than postal articles which are subject to a related type of classification), and to apparatus or equipment for carrying out such method. In these respects, the invention affords novel and improved steps and means for initially performing a rough, visual classifying of the articles and a signalling as to a desired subsequent destination, a conditioning of a receptacle actuator in response to the signal, the precisely controlled loading of the articles at the time of the signal onto a synchronously advancing main conveyor, and a gravitational discharge of the articles in question at the signalled destination station, by a tilting of a receptacle component of the main conveyor in one direction or another.

The foregoing, as well as other objects, will be made more apparent as this description proceeds, especially when considered in connection with the accompanying drawings, wherein:

FIG. 1 is a schematic layout in elevation of a typical post office installation embodying the equipment of the invention, illustrating several gravity destination chutes which are served by the primary or main conveyor of that system, with floor levels of the building shown in vertical section along the line of advance of that conveyor;

FIG. 2 is a fragmentary view showing the chute arrangement in vertical section at 90° to that of FIG. 1, the main conveyor also being indicated;

FIG. 3 is a generalized and schematic plan view of the basic components of a sorting system of the invention, avoiding undue or unnecessary duplication of components better shown in other views;

FIG. 6 is an end elevational view, as from the right of FIGS. 4 and 5, of the primary sorting and loading unit, its relation to a tiltable receptacle of the main conveyor being indicated in dot-dash line;

FIG. 7 is a fragmentary perspective view indicating the general natural of the flight type, push bar conveyor at the primary loading station;

FIG. 8 is a fragmentary elevational view of the transfer mechanism of the equipment of FIGS. 4, 5 and 6, as viewed from the line 8—8 of FIG. 4;

FIG. 9 is a fragmentary elevation of this mechanism from the line 9—9 of FIG. 4;

FIG. 10 is a fragmentary view in enlarged scale, partially broken away and in vertical section, showing details of an article transporting pan or receptacle of the main conveyor, and the manner of advancing and guiding the same;

FIG. 11 is a fragmentary view in vertical section on line 11—11 of FIG. 10;

FIG. 12 is a fragmentary view in side elevation, of a schematic nature, illustrating the nature of the conveyor pan guiding and controlling provisions according to the invention;

FIGS. 12A, 12B and 12C are fragmentary views showing, in larger scale, certain track switch and switch actuating provisions of FIG. 12;

FIG. 12D is a fragmentary view in section on line 12D—12D of FIG. 12A;

FIG. 12E is a fragmentary view in section on line 12E—12E of FIG. 12B;

FIG. 13 is a fragmentary view in transverse vertical section along the line 13—13 of FIG. 12;

FIG. 14 is a schematic fragmentary elevational view showing a further detail of the guide means whereby tilted and emptied conveyor receptacles are restored to their normal horizontal traveling position;

FIG. 15 is a fragmentary top plan view, schematic in nature, illustrating improved initial distribution structure for the system;

FIGS. 16A and 16B are fragmentary vertical sections along the lines 16A—16A and 16B—16B, respectively, of FIG. 15;

FIG. 17 is a schematic wiring diagram of electrical provisions involved in the operation of a memory device associated with each of the primary loading and sorting stations.

FIG. 18 is a simplified perspective view of one of these memory devices;

FIG. 19 is a view in side elevation of a component writer-reader wheel unit of the device of FIG. 18; and FIG. 20 is a fragmentary view in end elevation of said wheel unit, as viewed from the left of FIG. 19.

Figure 4:
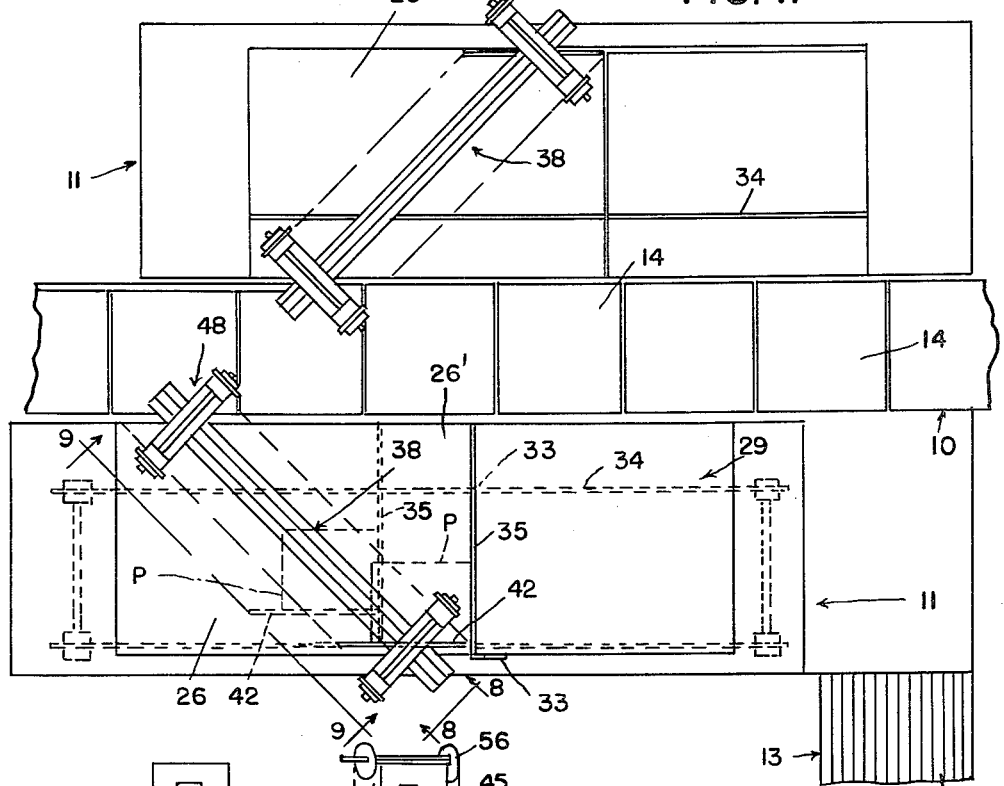
FIG. 4 is a fragmentary plan view showing a pair of primary sorting and loading stations associated with opposite sides of one reach of the main conveyor, as an alternative arrangement to that of FIG. 3 wherein the stations are along one side only, and indicating more clearly the make-up of an individual station.

Referring first to FIGS. 1, 2 and 3 of the drawings, showing the general layout of the improved system or apparatus, the same consists essentially of a main endless conveyor 10 traveling a horizontal orbit in an elongated outline, structural details of which conveyor will be hereinafter referred to; a number of primary sorting and loading stations, each generally designated 11, located adjacent one or both of the ends of the elongated conveyor path; and a series of destination chutes or chute stations, each generally designated 12, past which the conveyor 10 travels, these chutes being spaced in longitudinal succession and on either side of each of the elongated parallel reaches of the conveyor. As indicated above in regard to the general operation of the equipment, operators or attendants at each of the individual primary sorting or loading stations 11 take parcels from the adjacent feeder units 13, ascertain the destination or other classification thereof, place the same upon a push bar conveyor table of the station 11 (to be described), whose function is to feed the parcel in question onto one of the articulated pans or receptacles 14 of the conveyor 10, and then manipulate a selected push button (corresponding to the ascertained destination) on a memory device mounted at the station 11 (not shown in FIG. 3). This device is thus given a setting corresponding to the visually ascertained classification or destination and, following an interval sufficient to enable the conveyor 10 to transport the receptacle 14 in question and its load to the selected destination chute 12, a trip device at that chute is actuated, causing the receptacle to be tilted to one side or the other and thus gravitationally discharge the parcel to the chute.

As shown in FIGS. 1 and 2, the chutes 12 are downwardly inclined and laterally angled from their respective receiving mouths 16 through the upper or primary sorting floor 17 to the secondary sorting floor 18 below, a chute at one side of the main conveyor 10 discharging to the left and a chute at the opposite conveyor side discharging to the right. This is the arrangement at each of the respective successive sets of chute stations. An attendant on the secondary sorting floor, operating at the position marked 19, distributes the parcels destination-wise in the racked bags 20 at either side of him which are then removed and deposited in a double spiral chute 21, through which they reach a loading platform 22 at the bottom bag loading floor 23.

The operation of the conveyor pans or receptacles 14 is generally indicated in FIG. 2 of the drawings. As the receptacle is tilted upwardly at a chute station, as indicated in dotted line, under the controlling means to be hereinafter described, it discharges to a chute on one side, and as tilted downwardly (dot-dash line) it discharges in the opposite lateral and downward direction.

Figure 5:
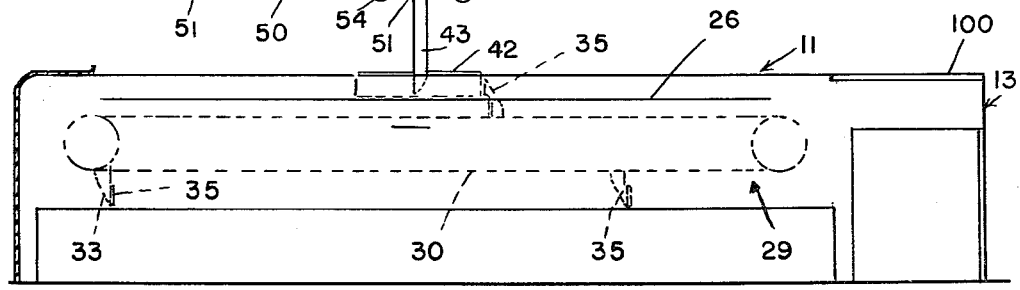
FIG. 5 is a schematic side elevational view illustrating the relationship of a flight type table loading conveyor and an angularly acting transfer unit of a station shown in FIG. 4.

Each of the primary sorting and loading stations 11, reference being had to FIGS. 4 through 9, comprises a horizontal plate-like table 26 fixedly supported in any appropriate fashion, as by the transversely spaced channels 27, on a basic channel frame-work 28. A push bar type conveyor, generally designated 29, travels orbitally about the table 26 in a longitudinal path to one side of and paralleling the path of main conveyor 10. The conveyor 29 comprises a pair of parallel endless chains 30 carrying longitudinally spaced guide rollers 31 which travel on tracks or ways 32 supported by the framework. Push flight brackets 33 are secured to the links of the respective chains 30 at either side of table 26 proper. The arrangement is such that an outer bracket remote from the main conveyor 10, travels along the side of table 26 remote from that conveyor, while a near bracket is accommodated in its longitudinal travel in a slot 34 between the near edge of the loading table 26 proper and a coplanar extension 26' thereof mounted by a channel in the same manner as the table 26.

A transversely elongated pusher flight 35 is secured across the forward faces of each pair of brackets 33, this being equipped with a rubber facing 36 along its free or outer edge which wipes along the upper surface of loading table 26. There are three of the pusher flights 35 in the embodiment of the invention shown, and they are advanced longitudinally at the same speed as the main conveyor 10, the chains 30 being operated to this end from a conventional drive for the main conveyor 10, which it is not deemed necesssary to show.

Each primary sorting and loading station 11 further comprises an angularly acting transfer mechanism 38 operating in conjunction with the pusher conveyor unit 29 and driven in accurately timed relation thereto by conventional operating connections (not shown). It is the function of the loading conveyor 29 and the transfer mechanism 38 to insure an accurately controlled advance of the parcels along the loading table 26 and its extension 26′ and onto a receptacle 14 of the main conveyor 10. In this connection it may be noted by reference to FIG. 10 of the drawings that each conveyor pan or receptacle 14 is in the form of a molded plastic unit or aluminum casting having a horizontal floor panel 39, and upstanding front and rear parcel retaining walls 40, the floor of the receptacles being unobstructed at its opposite longitudinal sides, and being coplanar with the conveyor table 26, 26′ immediately adjacent the edge thereof.

Again referring to FIGS. 4–9, the transfer mechanism 38, shown only schematically in all of these figures, is appropriately supported on the framework of the loading and sorting unit 11 in such a way as not to obstruct the sliding movement of parcels on that table. Structurally, the mechanism 38 comprises a transfer blade 42 whose length parallels the path of movement of push conveyor 29. The rear edge of the blade 42, as it is bodily moved by provisions to be described, is spaced only slightly in front of each advancing pusher flight 35, maintaining this spacing as it moves diagonally across the table 26, until the parcel is deposited by it and the flight onto the receptacle 14. The transfer blade 42 has an upright post or rod 43 secured thereto at its midpoint, and this bar is guided for vertical movement between opposed pairs of grooved rollers 44 which are journaled in vertical spaced relation to one another in a guide unit 45. The guide unit 45 is in turn equipped with pairs of laterally spaced, laterally projecting guide rollers 46 which travel in guide ways provided by elongated channels 47, which extend horizontally from a mount for the transfer mechanism 38 over the table 26. As shown in FIG. 8 of the drawings, the channels 47 are supported by an angle iron superstructure sustained by the framework 28 and generally designated 48, and are inclined diagonally of the table 26. Accordingly, an article forwarded by a pusher flight 35 is maintained under the positive control of that pusher, as well as under the positive side control of the synchronized transfer blade 42, as it is advanced in a corresponding diagonal path across the top of the table 26 and onto a main conveyor receptacle 14. As indicated above, the longitudinal speed of the pushers 35 and that of the longitudinal vector of the transfer blade speed are equal.

This transfer blade advance is occasioned by a pair of endless chains 50 trained about pairs of diagonally spaced end sprockets 51 disposed between the halves of the superstructure 48 and carried on shafts 52 journaled on and beneath the superstructure. The vertically guided upright post or rod 43 of the transfer blade 42 is disposed between and pivotally connected to the chains 50 as by means of a pivot pin 53 midway of the length of the rod 43.

Accordingly, a diagonally forwarded parcel reaches the entry side of a conveyor receptacle 14 properly located so as to enter onto the floor plate 39 thereof without interference with either the front or rear wall members 40 of the receptacle.

As the pivoted transfer blade connection 53 travels (in the direction indicated by the arrow in FIG. 9) upwardly around the end sprocket 51 adjacent the main conveyor 10, it is lifted, and since the blade post or rod 43 runs between rollers 44, the transfer blade 42 is thus cleared above the top of the trailing pusher flight 53 in making its retractive stroke away from the conveyor 10. The transfer blade 42 of course terminates its parcel advancing and controlling movement short of the outer edges of the end wall members 40 of receptacles 14 of the conveyor 10, so that interference with the latter never takes place.

The chains 50 are driven positively, in synchronism with the other parts as described, by sprockets 54 affixed to the respective chain sprocket shafts 52 and by chains 55 which are trained about further sprockets 56 on a shaft 57 journaled on the upper part of the superstructure 48. The shaft 57 is driven by an appropriate connection (not shown) to the drive means for the main conveyor 10.

Structural features of the main parcel conveyor 10, its individual articulated pans or receptacles 14 and the mechanical means for effecting a controlled tilting thereof at a selected one of the several chute stations 12, are illustrated in FIGS. 10 through 14 of the drawings. Each receptacle 14 is provided, at the side thereof adjacent the loading and sorting stations 11, with front and rear, downwardly depending, L-shaped brackets 58 to which an elongated cradle-like strap 59 of U-shaped outline is suitably pivoted at its opposite, upturned ends. This strap directly overlies an elongated continuous guide way 60, constituted by opposed angle iron members 61 which parallel the entire length of the conveyor 10. The way members 61 are appropriately secured to the framework 62 supporting the conveyor as by welding. Wear members 62′ may be fixedly applied to the inner surfaces of depending flanges of the way members 61 to laterally guide the chain rollers 63 of an endless suitably driven conveyor chain 64. It is with this chain that the loading and sorting pusher conveyor 29 and the transfer blade 42 of the transfer mechanism 38 are synchronized, as described.

As indicated in FIG. 10, the chain 64 is equipped with caster mounts 65 apertured vertically in alignment with certain of the chain rollers, which afford means to accommodate upright pivot stems 66 for nylon treaded guide rollers 67, the casters 65 being cut away to take the rollers. These rollers travel between the angle irons 61 (FIG. 11), laterally guiding the chain 64 and pivotally connected receptacles 14 in a non-frictional manner. An upper extension of the pivot stem 66 is received in a pilot washer 68 welded to the lower side of the receptacle pivoting cradle strap 59. The lower end of the stem 66 is journaled in the depending caster fork 69, in which the receptacle supporting caster roller 70 is appropriately journaled. Like the roller 67, the roller 70 has a nylon tread 71 for noiseless operation. Also like the roller 67, it is journaled on a ball bearing 72 for friction-free travel on a fixed track 73, which is appropriately supported on the conveyor frame work 62 (FIG. 11) beneath the endless drive chain 64.

The above structure affords basic guide and supporting track and receptacle pivoting means for the individual end-articulated conveyor receptacles 14. Pivotal tilting thereof is controlled by further guide and cam rod provisions along the opposite side of the series of conveyor receptacles 14, such as are illustrated in FIGS. 12, 13 and 14.

As shown, the structure in question comprises the intermediate, horizontal and longitudinally extending track rod 75 (see also FIG. 6) appropriately mounted by fixed brackets 76 on the framework 62 of the apparatus, an upper guide and cam rod 77 mounted directly above the rod 75 and also extending longitudinally of the conveyor 10, and a lower guide and cam rod 78 disposed beneath the rods 75 and 77. As shown in FIG. 13, these rods, though in the main in a common vertical plane, depart from coplanarity at the several chute stations 12 so as to maintain supporting engagement with the conveyor receptacles 14 in the tilting thereof.

Each receptacle 14 is provided with a laterally extending bracket 79 journaling a roller 80 at its end which is adapted to ride the respective guide and cam rods 75, 77 and 78, under the selective control of apparatus to be hereinafter described, and thereby cause the tilting of the conveyor receptacle in the manner shown best in FIG. 13. The upper rod 77 is provided with upwardly sloped entrance or rise portions 81 adjacent or at the approach to chute stations 12 along one side of conveyor 10, entrance to which portion (from the intermediate track 75) is controlled by a track switch 82 pivoted on the framework 62 adjacent the lower extremity of the track rise portion 81. In the position shown in solid lines in FIGS. 12 and 12A the switch 82 is held elevated by a solenoid controlled latch arm 83 pivoted on the framework 62, in opposition to the force of a coil spring 84 suitably anchored to the framework. When the switch 82 is unlatched from the arm 83 (by provisions to be described), it snaps to the position indicated in dotted line in FIGS. 12 and 12A, whereupon a receptacle track guide roller 80 rides up the inclined portion 81, passing beneath a pivoted flip track 85 and on to upper track 77, along which it proceeds in the direction indicated by the arrow in FIG. 12. This occasions a tilting of the receptacle 14 upwardly to the position indicated in dot-dash line in FIG. 13, discharging its content into the mouth 16 of a left hand chute station 12. A receptacle which has been similarly upended at another such preceding station in the series, will proceed from the preceding portion of upper guide rod 77, passing over the flip track 85.

Each of the track switches 82 is provided with a rear extension 86, which is cammed in clockwise direction as the receptacle roller 80 passes up the rod rise 81, thereby relatching the switch 82 as the roller 80 passes beneath a fixed restraining plate 87.

The intermediate guide rod 75 (FIGS. 12 and 12B) is also provided with forward, downwardly inclined drop portions 89, one at each of the chute stations 12 on the opposite side of conveyor 10 which lead to the lower guide rod 78, and onto which a receptacle roller 80 is adapted to travel as diverted by a pivoted track switch 90. Switch 90 is pivoted on the framework 62 and acts in the solid line position to support the receptacle for a continued horizontal travel along the intermediate rod 75. In the elevated, dotted line position it diverts the roller downwardly onto rod drop portion 89. This occasions a downward tilting of the receptacle 14 to the dotted line position of FIG. 13, discharging its contents to the right as viewed in that figure to a chute 12 at that side of the conveyor. Switch 90 is biased by a spring 90' anchored on the framework to the diverting position, and is latched downward by solenoid controlled latch arm 83' similar to the latch arm 83. The descending roller 80 passes over a flip track 92 (FIG. 12C), which is pivoted on the framework 62, onto rod 78. Switch 90 is freed for spring biased movement to the dotted line position by releasing the solenoid operated latch 83 and is returned to the full line, latched position by the roller as it passes under the downward extension 90" of switch 90, similar to the extension 86 of switch 82.

Provisions such as are illustrated in FIG. 14 are employed to restore all receptacles to their normal horizontal position, guided on the intermediate track 75, after all of the chute stations 12 have been passed. These provisions include flip tracks or switches 93 and 94 hinged respectively on an upward rise 95 of the lower guide rod 78, and a downwardly inclined drop portion 96 of the upper guide rod 77. Operation is as indicated in solid and dotted lines in FIG. 14, receptacle rollers 80 which are already on the intermediate track 75 riding over and under the respective flip switches 93, 94, with guide rollers approaching on the respective lower and upper guide rods 78, 77 guided past the same and back onto the intermediate guide rod 75. As so restored, the receptacles may pass another series of primary sorting and loading stations 11, at which they may be reloaded with parcels for disposition on the opposite elongated reach of main parcel conveyor 10. Two restoring stations are provided for conveyor 10, each just ahead of each group of four primary sorting and loading stations 11.

Reference has been made to the fact that parcels to be sorted are fed to the respective loading and sorting stations 11 (FIGS. 3, 4 and 5) by feeder units which deliver laterally inwardly to the respective stations 11. FIGS. 15, 16A and 16B of the drawings depict an improved feeder or supply conveyor unit 13 for the purpose.

As shown therein, the unit 13 is mounted on the floor level of the main sorting conveyor. It comprises an inclined parcel receiving bin 97 for each of the primary sorting stations 11, in which the parcels are deposited, the lower edge of this bin delivering to a set of parallel, upwardly inclined feeder belts 98 separated by dividers 99. The belts 98 are driven in any appropriate fashion, and deliver upwardly to a transversely acting horizontal belt conveyor 100, also powered in any suitable manner.

Conveyor belt 100 extends transversely toward the station 11 with which it is associated, and at its inner end delivers parcels onto an auxiliary horizontal table 101 positioned to one end of and somewhat above the table of the sorting and loading station 11.

Thus the attendants at the station 11 may be continuously and amply supplied with parcels to be sorted, simply reaching over to the conveniently located auxiliary table 101 and sliding parcels off the same and onto the table 26, in advance of the orbitally traveling pusher flight 35.

Reference has been made to the provision of a memory device for each of the primary sorting and loading stations 11, and in this connection attention is directed to FIGS. 18, 19 and 20 of the drawings, to be considered in conjunction with the schematic wiring layout of FIG. 17.

As shown in FIGS. 18, 19 and 20, the device in question, generally designated 108, embodies a synchronous wheel unit 109, one for each station 11, which is similar to units commercially available on the market, and no particular claim of invention is advanced as to the unit 109. Almost any type of memory system may be used for the purpose of the invention to store information entered by operators at the several primary sorting and loading stations 11, i.e., electronic, electrical, electromechanical, mechanical, or a combination thereof. Whatever the type, it will include a set of push button controls, not shown as such in the drawings but represented by the set of individual push button switches 110', 110" and 110''', and so on, of the wiring diagram (FIG. 17). One such set is located at each of the primary sorting stations 11.

Electrical connections are made from the respective memory wheel units 109 to each of the several chute stations 12 for the control of the track switches 82 or 90 (FIGS. 12, 12A and 12B) which govern the entry of a conveyor pan guide roll 80 onto either the rod rises 81 and to the upper guide rod 77, or onto the rod drop portions 89 and to the lower guide rod 78. As indicated above, this involves the use of pivoted latch arms 83 and 83' holding the respective track switches in opposition to actuating springs 84 and 90'. The latch arms 83' may be released to permit the springs to take charge by the energization of suitable solenoids 111, 111' shown in FIGS. 12D and 12E associated with the latch arms, in a manner which will be apparent to those skilled in the art. After being thus spring actuated, the track switches 82 and 90 are automatically reset and relatched by roller action on their rear extension.

As shown in FIGS. 18, 19 and 20, the unit 109 is devised for the control of five chute section latches, hence the wiring diagram of FIG. 17 shows five push button switches 110', 110" and so on. Each primary sorting station is accordingly so equipped, although the memory wheel units themselves may be physically disposed wherever it is convenient. There are five writer-reader wheels 112', 112", etc., for each unit 109, mounted on a common shaft 113 appropriately journaled in end bearing mounts 114 and driven in synchronism with the main conveyor 10, as through a mechanical takeoff 115 at one end of shaft 113. Associated with each memory wheel are four writer solenoids 116, appropriately mounted fixedly and having a reciprocal plunger or core 117. Upon electrical actuation of the solenoid, its plunger engages an aligned axially shiftable timing pin 118 carried in one of an annular series of openings in each of the wheels 112', 112", etc., in the manner indicated in FIG. 20. Each of the wheel openings is provided with a pin 118. A reader solenoid 119 is fixedly mounted on the opposite side of each memory wheel, having a switch element 120 adapted to be engaged and operated instantaneously by an advancing displaced timing pin 118 to close a circuit through a latch arm holding solenoid 111 or 111', as will be described, and a fixed reset cam 121 engages the pin following its actuation of switch element 120 and restores it to its original position on the wheel.

The wiring diagram of FIG. 17 schematically shows the circuitry for but a part of the memory devices 108, all of which are identical, having mechanical features as shown in FIGS. 18, 19 and 20 and electrical connections as shown in FIG. 17. Thus, with four writer solenoids 116 schematically shown for memory wheel units for but two successive chute stations, specially designated 12A and 12B in FIG. 17, it will be understood that the remaining three control units for the other three chute stations are identical.

Inasmuch as no claim of invention is made to the memory device and its wiring to the solenoids 111, 111', any further structural features thereof may be described to the extent necessary in a brief description of its operation.

An operator at one of the primary sorting and loading stations 11 takes a parcel P from the adjacent supply chute 13 and, noting the destination address, places that parcel on the sorting table 26 of his station and depresses a push button switch 110' or 110", and so on, which is identified with that destination, i.e. is connected in the wiring to the corresponding destination chute 12 from his own station. Depression of the push button causes energization of one of the writer solenoids 116 corresponding to the destination and pushes a pin 118 out of line on one of the memory wheels 112', 112", etc.

Since this wheel is driven in exact synchronism with the conveyor 10, the arcuate movement of the pin 118 is timed in direct synchronism with the location and movement of a receptacle 14 on the conveyor 10 as a pusher flight 35 and the transfer blade 42 at the station 11 deposit the receptacle in question on a particular conveyor receptacle.

After the selected wheel describes its predetermined circular path its offset pin 118 contacts and momentarily closes the sensitive reader switch 119. Closure of this switch results in a solenoid energized release of the switch 82 or 91, causing a tilting of the receptacle 14 at the selected destination chute as its roller 80 is guided by the rod means 75, 77, 78 and associated track switches.

Since the circuitry from all of the push button keyboards for the stations 11 is identical, a description of the operation of one will suffice. Referring to FIG. 17, energization of each of the push button switches will energize its corresponding control relay 121, each of the relays having two contacts 121a and 121b. The contact 121a acts as a holding contact and the contact 121b transmits a signal to a writer solenoid 116 on the memory wheel.

An indicating light 122 is connected across each of the control relays 121 to signal the operator when the particular relay is energized. A push button switch 123 also wired in the circuit is a "cancel" switch which allows the operator to cancel out his keyboard in the event he has made a wrong selection. Two limit switches 124 and 125 are included in the circuit, these switches being physically located at extremes of the movement of the transfer blade 42 at the primary sorting and loading station 11. Limit switch 125 is normally open, except during the instant when a pusher flight 35 and the transfer mechanism 38 are pushing the parcel onto the conveyor. It is during this time that power is supplied to the selected writer solenoid of the memory wheel. Limit switch 124 performs the function of resetting the keyboard and is normally closed except for the interval of time immediately following the momentary closing of limit switch 125.

Assuming that the operator at a loading station has placed a selected parcel P on the loading table and depressed a push button corresponding to a given destination station 12, the control relay 121 corresponding to that station is energized and locked in through its holding contact 121a. Its indicator light 122 illuminates but nothing further happens until the transfer mechanism 38 begins to sweep the parcel onto the conveyor 10. At this time limit switch 125 closes momentarily, transmitting power through the closed contact 121b to energize the writer solenoid 116 for the selected chute station, and thus displacing a timing pin 118. Immediately following this, limit switch 124 opens momentarily, dropping out the appropriate relay 121 and resetting the sorting keyboard to normal, which allows it to answer the next command from the operator.

When the displaced pin 118 closes reading switch 119 for the station in question, the parcel P being at that time opposite the selected chute 12, power is transmitted to the solenoid of the track switch latch 83 or 83' for the station, as though the line 127 (FIG. 17), resulting in dumping of the parcel as described. The latch resets mechanically, as by mechanical actuation of a suitable limit switch (not shown) by the passing receptacle or by the displaced track switch 82 or 90, in a manner which will suggest itself; the displaced pin 118 on the memory wheel is also reset mechanically, and the cycle is finished.

It will be apparent that although an installation involving the operation of four loading stations (four writer solenoids 116) and five discharge chute stations 12 has been shown and described, the system can be expanded to include almost any number of loading and discharge stations by simply repeating the mechanical arrangements and electrical circuitry shown.

In the installation and use of the system, the synchronization of the pusher flights 35 of each station 11 of, say, four of the primary sorting and loading stations 11, is such that each station loads parcels on different pans or receptacles 14. Thus, as one group of four successive pans passes the four stations 11, a first station loads a first pan, a second station the second pan, the third station the third pan, and the fourth station the fourth pan. The next and all following groups of four pans each receive parcels in like manner; and it is evident that the system will not function properly if one pan or receptacle should receive parcels P from two or more primary sorting and loading stations 11. Jamming and incorrect dispatch would result.

The advantage of the primary sorting and loading stations is important and is two-fold. First, they relieve the operator of the necessity of placing parcels on a fast moving conveyor and thus speed up and relieve the strain of his work. Second, the timing of push bar conveyors 29 assures that the parcels are placed in proper pans which respond to the operator's push button signal. Considering the enormous quantity of parcels handled in larger post offices, both of these functions are very important.

What I claim as my invention is:

1. A sorting system of the class described, comprising an endless conveyor having parcel transporting members articulated thereon to one another, said members being individually pivoted to said conveyor for selective bodily tilting toward either side thereof and traveling in a horizontal plane, means providing a plurality of receiving stations spaced in succession along and to either side of the path of travel of said conveyor, a control device to cause selective tilting of said members about the respective pivots thereof to discharge parcels at said respective stations, and means providing at least one sorting station in advance of said receiving stations, said sorting station being provided with a selective, manually actuable memory device operatively connected with said receiving stations to actuate said control device in variably delayed response to the selective manual actuation of the memory device.

2. A sorting system of the class described, comprising an endless conveyor having a series of parcel transporting members articulated thereon to one another, said members being individually pivoted to said conveyor for bodily tilting toward a side thereof and traveling in a horizontal plane, means providing a plurality of receiving stations spaced in succession along and to a side of the path of travel of said conveyor, a control device at each of said stations to cause tilting of said members about the respective pivots thereof to discharge parcels at said respective stations, and means providing a plurality of sorting stations adjacent said conveyor and in advance of said receiving stations, each of said sorting stations being provided with a selective, manually actuable memory device operatively connected with said receiving stations to actuate said control devices thereof in variably delayed response to the selective manual actuation of the memory device, and being further provided with means delivering parcels from said station to only one of the respective parcel transporting members of said series.

3. A sorting system of the class described, comprising an endless conveyor having a series of arcel transporting members articulated thereon to one another, said members being indivdually pivoted to said conveyor for selective bodily tilting toward either side thereof and traveling in a horizontal plane, means providing a plurality of receiving stations along either side of the path of travel of said conveyor, a control device to cause selective tilting of said members about the respective pivots thereof to discharge parcels at said respective stations, and means providing a pluarlity of sorting stations in advance of said receiving stations, each of said sorting stations being provided with means whereby parcels are automatically placed on only one of the respective parcel transporting members of said series, and being further provided with a selective, manually actuable memory device operatively connected with said receiving stations to actuate said control device in delayed response to the selective manual actuation of the memory device.

4. A sorting system of the class described, comprising an endless conveyor having a series of parcel transporting members articulated thereon to one another, said members being individually pivoted to said conveyor for selective bodily tilting toward either side thereof and traveling in a horizontal plane, means providing a plurality of receiving stations along and to either side of the path of travel of said conveyor, a control device at each of said stations to cause selective tilting of said members about the respective pivots thereof to discharge parcels at said respective stations, and means providing a plurality of sorting stations adjacent said conveyor and in advance of said receiving stations, each of said sorting stations being provided with means whereby parcels are automatically placed on only one of the parcel transporting members of said series and being further provided with a selective, manually actuable memory device operatively connected with said receiving stations to actuate said control devices thereof in variably delayed response to the selective manual actuation of the memory device.

5. A sorting system of the class described, comprising an endless main conveyor having parcel transporting members traveling in a horizontal plane, means providing a plurality of receiving stations adjacent the path of travel of said conveyor, a control device to selectively actuate said conveyor members to discharge parcels at said respective stations, means providing a sorting station adjacent said conveyor and in advance of said receiving stations, said sorting station being provided with a loading table, a loading conveyor operating in synchronism with said main conveyor to advance parcels on said table parallel to said main conveyor, and a transfer mechanism operating diagonally of said loading table and in synchronized conjunction with said loading conveyor to shift said parcels onto said main conveyor members, and a selective, manually actuable memory device associated with said sorting station and operatively connected with all of said respective receiving stations to actuate said selective control discharge device in delayed response to the selective manual actuation of the memory device.

6. A sorting system of the class described, comprising an endless main conveyor having parcel transporting members traveling in a horizontal plane, means providing a plurality of receiving stations spaced in succession along and to a side of the path of travel of said conveyor, a control device at each of said stations to selectively actuate said conveyor members to discharge parcels at said respective stations, means providing a sorting station adjacent said conveyor and in advance of said receiving stations, said sorting station being provided with a loading table, a loading conveyor operating in synchronism with said main conveyor to advance parcels on said table parallel to said main conveyor, and a transfer mechanism operating diagonally of said loading table and in synchronized conjunction with said loading conveyor to shift said parcels onto said main conveyor members, and a selective, manually actuable memory device associated with said sorting station and operatively connected with all of said respective receiving stations to actuate said selective control discharge devices thereof in variably delayed response to the selective manual actuation of the memory device.

7. A sorting system of the class described, comprising an endless main conveyor having individually piovted parcel transporting members traveling in a horizontal plane, means providing a plurality of receiving stations spaced in succession along and to a side of the path of travel of said conveyor, a control device at each of said stations to selectively tilt said conveyor members about the pivot thereof to discharge parcels at said respective stations, means providing a sorting station adjacent said conveyor and in advance of said receiving stations, said sorting station being provided with a loading table, a loading conveyor operating in synchronism with said main conveyor to advance parcels on said table parallel to said main conveyor, and a transfer mechanism operating diagonally of said loading table and in synchronized conjunction with said loading conveyor to shift said parcels onto said main conveyor members, and a selective, manually actuable memory device associated with said sorting station and operatively connected with all of said respective receiving stations to actuate said selective control discharge devices thereof in variably delayed response to the selective manual actuation of the memory device.

8. A sorting system of the class described, comprising an endless main conveyor having individually pivoted parcel transporting members traveling in a horizontal plane, means providing receiving stations on either opposite side of the path of travel of said conveyor, control means to selectively tilt said conveyor members from normal horizontal position in either direction about the pivot thereof, thus to discharge parcels selectively and oppositely at said respective stations, and means providing at least one sorting station adjacent said conveyor and in advance of said receiving stations, at which sorting station parcels are placed on selected conveyor members.

9. A sorting system of the class described, comprising an endless main conveyor having individually pivoted parcel transporting members traveling in a horizontal plane, means providing receiving stations on either opposite side of the path of travel of said conveyor, control means to selectively tilt said conveyor members from normal horizontal position in either direction about the pivot thereof, thus to discharge parcels selectively and oppositely at said respective stations, and means providing a plurality of sorting stations adjacent said conveyor and in advance of said receiving stations, at which sorting stations parcels are placed on selected conveyor members.

10. A sorting system of the class described, comprising an endless main conveyor having individually pivoted parcel transporting members traveling in a horizontal plane, means providing receiving stations on either opposite side of the path of travel of said conveyor, control means to selectively tilt said conveyor members from normal horizontal position in either direction about the pivot thereof, thus to discharge parcels selectively and oppositely at said respective stations, and means providing at least one sorting station adjacent said conveyor and in advance of said receiving stations, at which sorting station parcels are placed on selected conveyor members, said last named means including a selective, manually actuable memory device associated with said sorting station which is operatively connected with all of said receiving stations to actuate said control means in delayed response to the selective manual actuation of the memory device.

11. A sorting system of the class described, comprising an endless main conveyor having individually pivoted parcel transporting members traveling in a horizontal plane, means providing receiving stations spaced along and on either opposite side of the path of travel of said conveyor, control means at each of said stations to selectively tilt said conveyor members from normal horizontal position in either direction about the pivot thereof, thus to discharge parcels selectively and oppositely at said respective stations, and means providing at least one sorting station adjacent said conveyor and in advance of said receiving stations, at which sorting station parcels are placed on selected conveyor members, said last named means including a selective, manually actuable memory device associated with said sorting station which is operatively connected with all of said receiving stations to actuate said control means in variably delayed response to the selective manual actuation of the memory device.

References Cited in the file of this patent

UNITED STATES PATENTS

| | | |
|---|---|---|
| 1,440,204 | Alschuler | Dec. 26, 1922 |
| 1,528,227 | Spooner | Mar. 3, 1925 |
| 2,016,535 | Bogaty | Oct. 8, 1935 |
| 2,046,935 | Cadman | July 7, 1936 |
| 2,192,575 | Hewitt | Mar. 5, 1940 |
| 2,194,381 | Cadman | Mar. 19, 1940 |
| 2,319,833 | Troy | May 25, 1943 |
| 2,344,596 | Carmina | Mar. 21, 1944 |
| 2,375,863 | Mitchell | May 15, 1945 |
| 2,441,323 | Klammt et al. | May 11, 1948 |
| 2,603,340 | Warren et al. | July 15, 1952 |
| 2,667,260 | Pyles | Jan. 26, 1954 |
| 2,722,305 | McCabe | Nov. 1, 1955 |

FOREIGN PATENTS

| | | |
|---|---|---|
| 39,987 | Austria | Dec. 10, 1909 |
| 51,408 | Sweden | Feb. 22, 1918 |